United States Patent

[11] 3,576,951

[72] Inventors Tomomi Uchida;
Takeshi Kondo, Tokyo-to; Hiroshi Takada, Kawasaki-shi; Hiroaki Eguchi, Tokyo; Kenichi Hasegawa, Yokohama-shi, Japan

[21] Appl. No. 781,048
[22] Filed Dec. 4, 1968
[45] Patented May 4, 1971
[73] Assignees Nippon Electric Company, Limited
Tokyo-to, Japan
fractional part interest to each;
Fusitsu Limited
Kawasaki, Japan, fractional part interest to each
[32] Priority Dec. 9, 1967
[33] Japan
[31] 42/78280

[54] CALLING SUBSCRIBER IDENTIFICATION SYSTEM
2 Claims, 4 Drawing Figs.

[52] U.S. Cl. .......... 179/18, 179/27
[51] Int. Cl. .......... H04m 3/42
[50] Field of Search .......... 179/18.61, 27.12; 179/5.5

[56] References Cited
UNITED STATES PATENTS

| | | | |
|---|---|---|---|
| 3,488,751 | 1/1970 | Gerhe et al. | 178/18 |
| 3,015,698 | 1/1962 | Pedrick | 179/18(.61) |
| 3,385,933 | 5/1968 | Abert et al. | 179/18(.61) |
| 3,431,364 | 3/1969 | Siegel | 179/18(.61) |

*Primary Examiner*—Kathleen H. Claffy
*Assistant Examiner*—Jan S. Black
*Attorneys*—Curt M. Avery, Arthur E. Wilfond, Herbert L. Lerner and Daniel J. Tick

ABSTRACT: A calling subscriber identification system in an automatic telephone exchange system determines the telephone number of a calling subscriber upon the calling subscriber making a telephone call to a called subscriber. The telephone number of the called subscriber is determined. Subscriber-determining apparatus determines if the called subscriber is a specific subscriber in accordance with the telephone number of the called subscriber. A recorder records the telephone number of the calling subscriber when the subscriber determining means determines that a telephone connection is made between the calling subscriber and the specific subscriber as the called subscriber. Calling subscriber identifying apparatus determines and indicates from the recorder the telephone number of the calling subscriber upon a command signal from the called subscriber. The command signal is produced and transmitted to the calling subscriber identifying apparatus under the control of the called subscriber.

CALLING SUBSCRIBER IDENTIFICATION SYSTEM

DESCRIPTION OF THE INVENTION

The present invention relates to a calling subscriber identification system. More particularly, the invention relates to a calling subscriber identification system in an automatic telephone exchange system. The calling subscriber identification system of the present invention is specifically for the purpose of identifying a calling subscriber who makes a malicious, criminal, disturbing, annoying, threatening, or the like, telephone call.

Generally, the release or opening of an audio or talking channel upon completion of a call in a telephone exchange system, is controlled by the calling subscriber control system. Therefore, if it is desired to identify the calling subscriber for any reason, this must be accomplished only during the duration of the telephone call. After the calling subscriber has replaced the telephone receiver in its cradle, the audio channel is released or opened and it is difficult to identify him. When the telephone call is criminal and involves or relates to the perpetration of a criminal act, or is malicious, threatening, or the like, it is necessary and desirable that a record be made as evidence of the call. To provide such a record, it is necessary to punch, print, or otherwise record, detailed records of calls in the originating and terminating offices of the telephone exchange system. The mere opening of an audio or talking channel is not sufficient legal evidence of the making of a criminal phone call.

It is desirable that the calling subscriber not be made aware of the fact that, during and after the call, a procedure for identifying him is in operation. That is, it is desirable to prevent the calling subscriber from becoming aware of the fact that the called subscriber or the receiving station has initiated identification proceedings. The calling subscriber may be made aware of the fact that his identity is being sought when the called subscriber dials a specific number on his telephone handset during the telephone call, or various audible signals are transmitted over the audio channel, which may be heard by the calling subscriber. It is also desirable to avoid the necessity for maintaining the audio channel held after the termination of the call.

The following requirements must be satisfied in order to identify the calling subscriber:

1. The initiation of the identification process by the called subscriber must be simple and safe, so that the calling subscriber may be identified even if there is an error in operation.

2. The telephone call must not be disturbed or cut off by the initiation of the identification process by the called subscriber.

3. It must be possible to investigate any telephone connection in the telephone exchange.

4. The calling subscriber must be identified during the duration of the call. This is a general necessity, and is a particular necessity when the calling subscriber is making the call from a public telephone.

5. The telephone number of the calling subscriber must be determined as soon as possible without difficulty to the telephone system maintainer or maintenance personnel. Therefore, a reverse investigation of the audio channels is not desirable. It is desirable that identifying information or data relating to the telephone number of the calling subscriber be made immediately available by recording apparatus.

The principal object of the present invention is to provide a new and improved calling subscriber identification system.

An object of the present invention is to provide a calling subscriber identification system which satisfies each of the five basic requirements hereinbefore set forth.

An object of the present invention is to provide a calling subscriber identification system which functions with efficiency, effectiveness and reliability.

In accordance with the present invention, a calling subscriber identification system comprises means for determining the telephone number of the called subscriber and means for determining the identity of the calling subscriber. These means are provided in the telephone exchange equipment at the calling or dialing station. Recording means records the telephone number of the calling subscriber on a suitable record medium if the determining means determines that the telephone number of the called subscriber, as dialed by the calling subscriber, is a specific subscriber. Simultaneously, the telephone exchange equipment at the calling station controls the call based on the results of the determination, so that a telephone connection between the calling subscriber and the called subscriber in the same telephone exchange or in another telephone exchange may be provided via the calling subscriber telephone number determining means. Investigation-initiating means are operable by the called subscriber as soon as the called subscriber becomes aware of the fact that the call instituted by the calling subscriber is criminal, or the like. The investigation-initiating means comprises a single instantaneous depression and release of the telephone handset cradle switch during the duration of the call. The investigation-initiating means may also comprise the called subscriber maintaining the receiver off the cradle switch for a predetermined period of time after the call has been terminated by the calling subscriber. Identifying means at the calling station telephone exchange actuated by the calling subscriber telephone number identifying means indicates that the calling subscriber is making or has made a criminal call.

In accordance with the present invention, a calling subscriber identification system in an automatic telephone exchange system comprises calling number determining means for determining the telephone number of a calling subscriber upon the calling subscriber making a telephone call to a called subscriber. Called number determining means determines the telephone number of the called subscriber. Subscriber-determining means determines if the called subscriber is a specific subscriber in accordance with the telephone number of the called number determining means. A recorder records the telephone number of the calling subscriber when the subscriber-determining means determines that a telephone connection is made between the calling subscriber and the specific subscriber as the called subscriber. Calling subscriber identifying means determines and indicates from the recorder the telephone number of the calling subscriber upon a command signal from the called subscriber. Signalling means produces and transmits to the calling subscriber identifying means the command signal under the control of the called subscriber.

Connecting means connects the calling subscriber with the called subscriber via the calling subscriber identifying means. A link frame has input means and output means. The calling subscriber identifying means is connected to the input means and the output means of the link frame. Connecting means connects the calling subscriber with the calling subscriber identifying means via the output means of the link frame and connecting means connects the called subscriber with the calling subscriber identifying means via the input means of the link frame.

The signalling means comprises instantaneous cutoff of the telephone connection or means of retaining the receiver of the telephone of the called subscriber off the cradle switch.

In accordance with the present invention, a method of calling subscriber identification in an automatic telephone exchange system comprises the steps of determining the telephone number of a calling subscriber upon the calling subscriber making a telephone call to a called subscriber. The telephone number of the called subscriber is determined. It is determined if the called subscriber is a specific subscriber in accordance with the telephone number of the called subscriber. The telephone number of the calling subscriber is recorded when a telephone connection is made between the calling subscriber and the specific subscriber as the called subscriber. The telephone number of the calling subscriber is determined and indicated upon a command signal from the called subscriber. The command signal is produced and transmitted under the control of the called subscriber.

In order that the present invention may be readily carried into effect, it will now be described with reference to the accompanying drawings, wherein.

Figure 4:
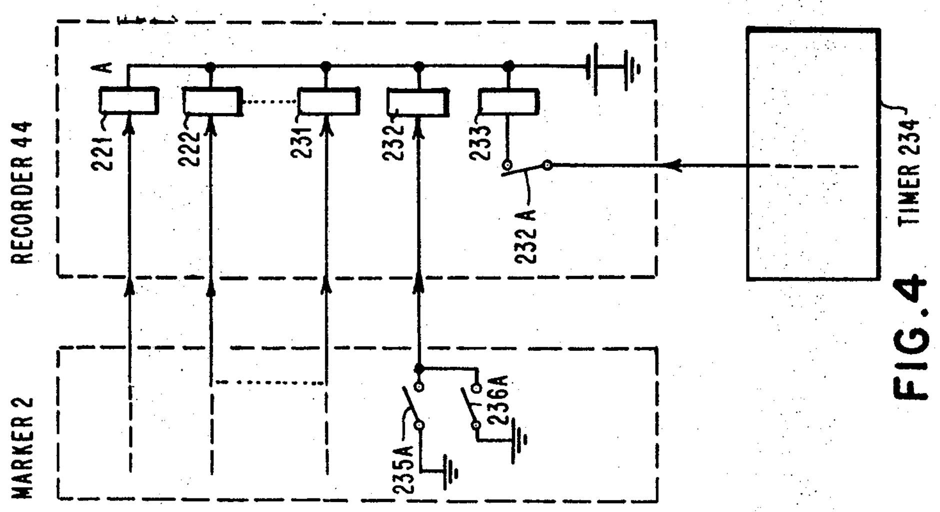
Figure 1:
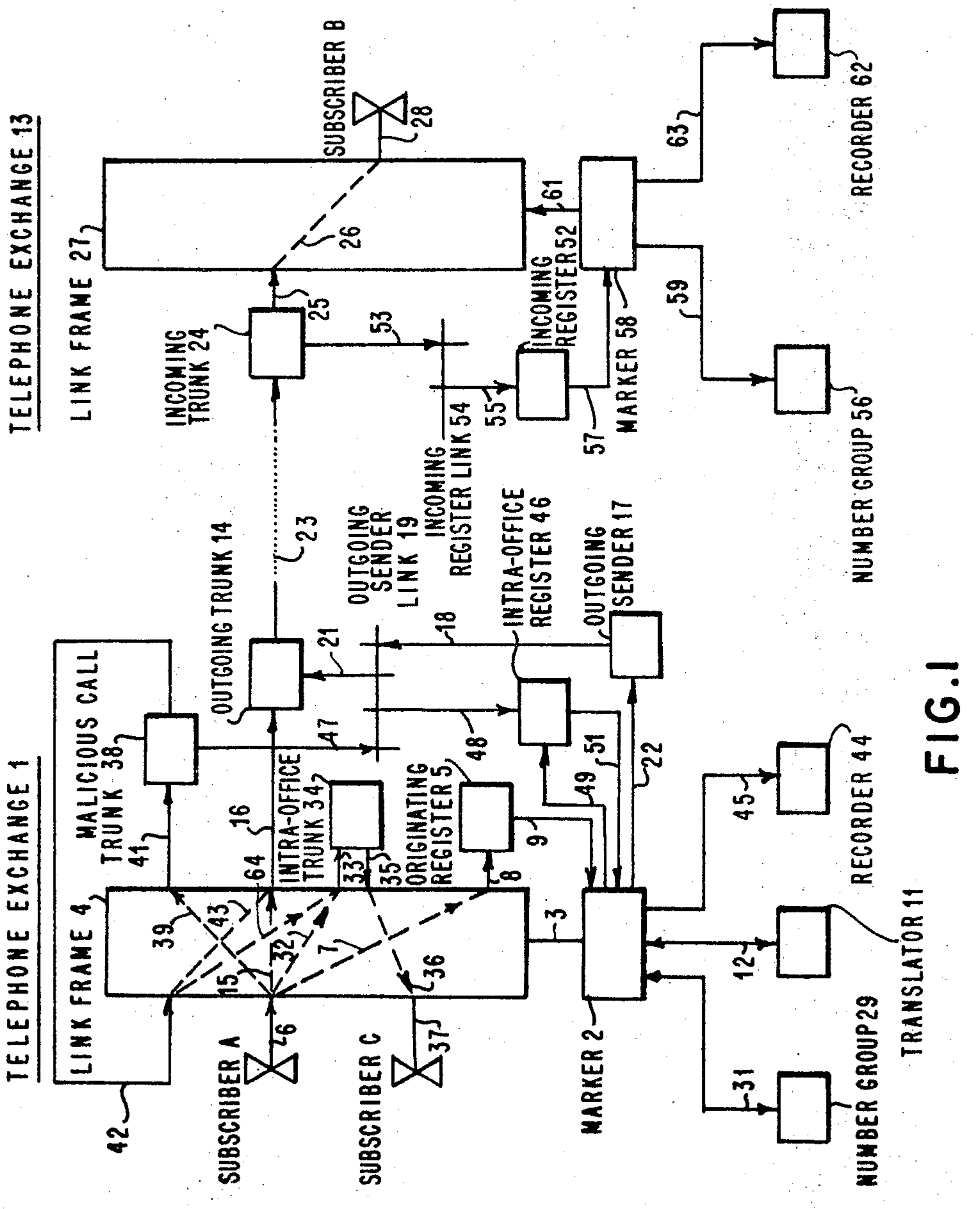
FIG. 1 is a block diagram of an embodiment of a telephone system including an embodiment of the calling subscriber identification system of the present invention.
Figure 3:
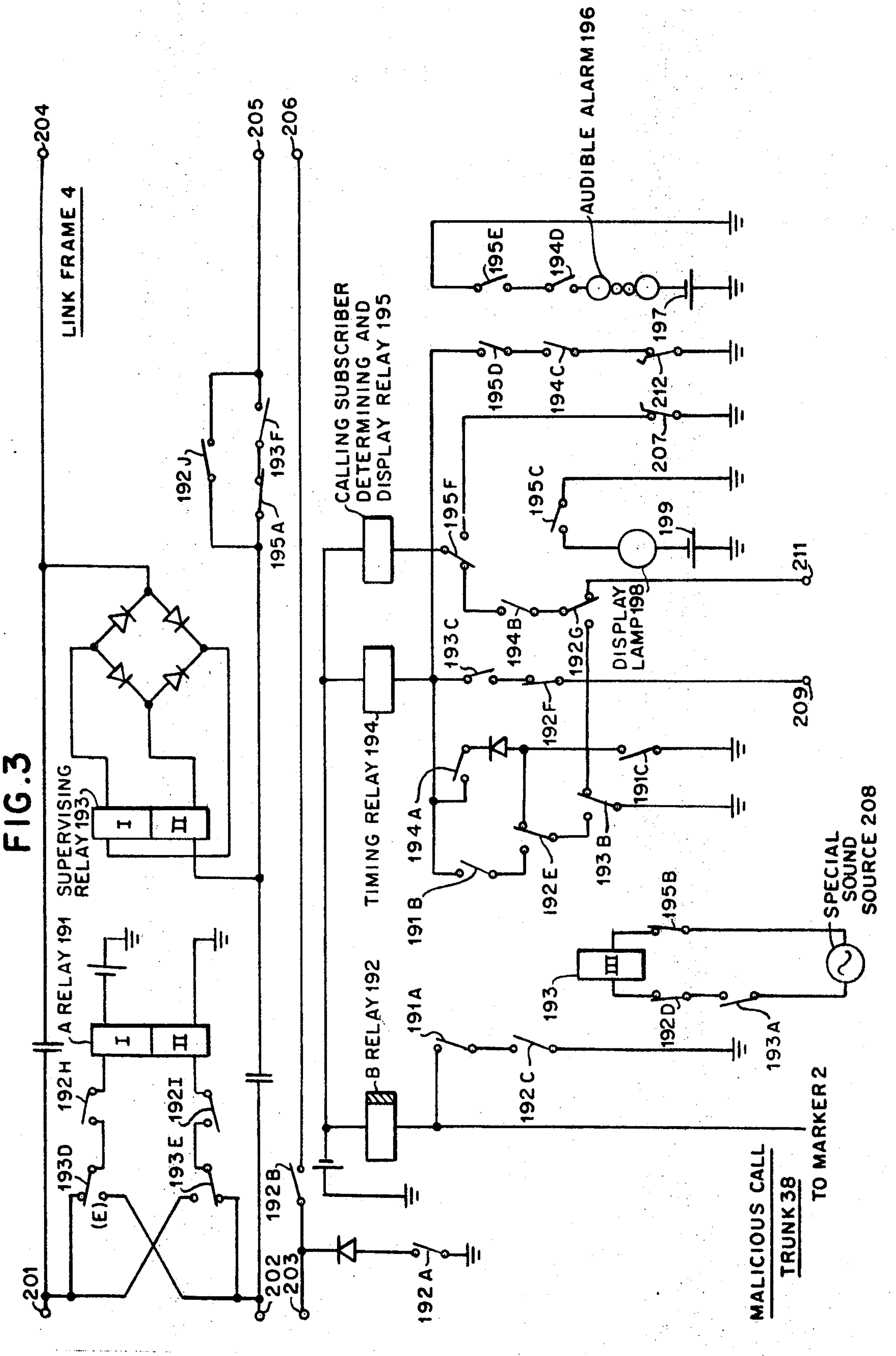

FIG. 3 is a schematic circuit diagram of the malicious call trunk 38 of the embodiment of FIG. 1; and FIG. 4 is a schematic circuit diagram of parts of the marker 2 and the recorder 44 of the embodiment of FIG. 1.

In the telephone system of FIG. 1, if a subscriber A of the telephone exchange or calling station 1 originates a call, a marker 2 determines that the call has been originated, by a known procedure utilizing known apparatus. The marker 2 determines via electrical conductors 3 the position in a link frame 4 at which the calling subscriber A is housed and connects said calling subscriber with an originating register 5 via electrical conductors 6, a route 7 through the link frame 4, and electrical conductors 8, in accordance with the identifying information of the housing position in said link frame.

The marker 2 simultaneously transfers the information which identifies the position of the housing of the calling subscriber A to the originating register 5 and said originating register records such information. Upon completion of the operation of the marker 2, said marker is released or deenergized. When the calling subscriber A dials the telephone number of the called subscriber, the information identifying the telephone number of said called subscriber is transmitted from the handset of said calling subscriber to the originating register 5, which records same. When the originating register 5 has received the entire telephone number of the called subscriber, said originating register initiates the operation of the marker 2 via electrical conductors 9 and transfers the information recorded therein, which identifies the telephone number of the called subscriber and the position at which the calling subscriber A is housed in the link frame 4, to said marker via said electrical conductors.

The marker 2 transfers the information identifying the telephone number of the called subscriber to a translator 11 via electrical conductors 12. The translator 11 determines the type of connection, form of signal and route, in accordance with the information identifying the telephone number of the called subscriber and transfers the determined information back to the marker 2 via the electrical conductors 12. When the marker 2 determines, from the information returned by the translator 11, that the connection is a dialing connection such as, for example, a connection with a subscriber B at a telephone exchange 13, the calling subscriber A is connected with an outgoing trunk 14 via the conductors 6, a route 15 through the link frame 4, and electrical conductors 16. An outgoing sender 17 is simultaneously connected to the outgoing trunk 14 via electrical conductors 18, an outgoing sender link 19 and electrical conductors 21.

The marker 2 then transfers the information which identifies the telephone number of the called subscriber B to the outgoing sender 17 via electrical conductors 22. The outgoing sender 17 transmits the information which identifies the telephone number of the called subscriber, received from the marker 2, as a signal to the telephone exchange 13. The calling subscriber A is then connected with the called subscriber B via the conductors 6, the route 15 through the link frame 4, the conductors 16, the outgoing trunk 14, a trunk line 23, an incoming trunk 24 of the telephone exchange 13, electrical conductors 25, a route 26 through a link frame 27 of the telephone exchange 13 and electrical conductors 28. This is accomplished by known equipment in a known manner.

If the marker 2 determines from the information returned by the translator 11 that the connection is to be made with a subscriber C of the same telephone exchange or calling station 1, the information which identifies the telephone number of the called subscriber is transferred to a number group 29 via electrical conductors 31. The number group 29 functions to convert the information identifying the telephone number of the called subscriber into information identifying the position in the link frame 4 at which said called subscriber is housed, and transfers such information back to the marker 2 via the conductors 31. The marker 2 then connects the calling subscriber A with the called subscriber C via the conductors 6, a route 32 through the link frame 4, electrical conductors 33, an intraoffice trunk 34, electrical conductors 35, a route 36 through said link frame and electrical conductors 37, in accordance with the information returned by the number group 29 which indicates the position at which the called subscriber is housed in said link frame.

The foregoing connection of the subscribers by the telephone system is general. The connection hereinafter described is that which is made by the telephone system when the calling subscriber A is identified in accordance with the present invention. It is assumed, for the purposes of illustration, that the called subscriber B at the telephone exchange or called station 13 is the recipient of a criminal, or the like, call made by the calling subscriber A from the telephone exchange or calling station 1. The telephone number of the specific called subscriber B is set in the translators of the telephone exchanges 1 and 13 in order to identify the calling subscriber A. The setting of the telephone number determining means is hereinafter described.

As soon as the calling subscriber A has dialed the telephone number of the called subscriber B, the marker 2 transfers the telephone number identifying information of said called subscriber, which has been transferred from the originating register 5, to the translator 11. If the translator 11 determines that the telephone number identifying information of the called subscriber is the telephone number of the specific subscriber B, such determination is conveyed to the marker 2. The marker 2 then connects the calling subscriber A to a malicious call trunk 38 in the telephone exchange 1, which malicious call trunk is the calling subscriber identifying device of the present invention, via electrical conductors 6, a route 39 through the link frame 4, and electrical conductors 41. The marker 2 also connects the malicious call trunk 38 to the outgoing trunk 14 via electrical conductors 42, a route 43 through the link frame 4 and the conductors 16, in accordance with the information provided by the translator 11.

The marker 2 also transfers the information indicating the position at which the calling subscriber A is housed in the link frame 4 to a recorder 44 via electrical conductors 45. The recorder 44 records the information transferred from the marker 2. The calling subscriber A is connected to the malicious call trunk 38 and said malicious call trunk is connected to the outgoing trunk 14 in the following manner. The marker 2 connects the calling subscriber A to the malicious call trunk 38 in accordance with the information transferred from the translator 11. The marker 2 also selectively actuates an intraoffice register 46 and connects the malicious call trunk 38 to said intraoffice register via electrical conductors 47, the outgoing sender link 19 and electrical conductors 48. The telephone number identifying information of the called subscriber B is then transferred from the marker 2 to the intraoffice register 46 via electrical conductors 49 and said marker is released. The intraoffice register 46 reactuates the marker 2 via electrical conductors 51, and transfers the telephone number identifying information of the called subscriber initially transferred from said marker back to said marker via said electrical conductors.

When the marker 2 is energized or actuated, it is made aware of the position at which the malicious call trunk 38 is housed in the link frame 4 by known apparatus in a known manner, and conveys to the translator 11 the telephone number identifying information of the called subscriber and the fact that said translator has been actuated for the second time. If the marker 2 receives the form of signal and the information of route from the translator 11, said marker selectively connects the malicious call trunk 38 to the outgoing trunk 14 and also selectively connects the outgoing sender 17 to said outgoing trunk via the outgoing sender link 19, and transfers the telephone number identifying information of the called subscriber to said outgoing sender. The outgoing sender 17 transfers the telephone number identifying information of the called subscriber to the telephone exchange 13 via the outgoing trunk 14 in the specific form of signal.

In the telephone exchange or called station 13, the telephone number identifying information of the called subscriber is received by an incoming register 52 from the incoming trunk 24 via electrical conductors 53, an incoming register link 54 and electrical conductors 55. The telephone number identifying information of the called subscriber is transferred from the incoming register 52 to a number group 56 via electrical conductors 57, a marker 58 and electrical conductors 59. If the number group 56 determines that the telephone number identifying information of the called subscriber is the telephone number of the specific subscriber B, the marker 58 connects said subscriber B with the incoming trunk 24 by means of electrical conductors 61, via the conductors 25, the route 26 through the link frame 27 and the conductors 28. At the same time, a recorder 62 at the telephone exchange 13 records the telephone number of the called subscriber B, the number of the incoming trunk 24 used for the call from the calling subscriber A to said called subscriber, the time, and other data, via electrical conductors 63.

After the initiation of the call between the calling subscriber A and the called subscriber B, if said called subscriber decides or recognizes that the call is criminal, malicious, threatening, intimidating, coercive, abusive, or the like, said called subscriber depresses the cradle switch of his handset for an instant. The instantaneous depression of the handset cradle switch is detected by the malicious call trunk 38 of the telephone exchange 1 and is displayed to the maintenance personnel of said telephone exchange by a suitable indicator such as, for example, a bell or a buzzer, or a lamp. The maintainer or maintenance personnel may then identify the calling subscriber A immediately by investigating the contents of the recorder 44, recorded when said calling subscriber dialed the called subscriber B. If the called subscriber B forgets to instantaneously depress the cradle switch of his handset, specific audible signals are sent from the malicious call trunk 38 to said called subscriber for 10 to 20 seconds after the calling subscriber A has terminated the call. If the called subscriber B does not replace his receiver during such period of time, the malicious call trunk 38 determines that the calling subscriber A has made a criminal, or the like, phone call and displays such fact to the maintenance personnel by actuating the suitable visual or audible alarm.

As hereinbefore described, the specific called subscriber B need only depress the cradle switch of his telephone instantaneously, or keep his receiver off said cradle switch for a predetermined period of time after the completion of the call by the calling subscriber A, so that the activity required of the called subscriber is very simple. When it is impossible to permit instantaneous interruption of the call by depression of the cradle switch by the called subscriber, it is possible to provide an extra pushbutton which functions in the same manner.

The foregoing description of the operation of the calling subscriber identification system of the present invention is one in which the called subscriber B and the calling subscriber A are at different telephone exchanges. The called subscriber B may, of course, be in the same telephone exchange as the calling subscriber A. If this is the case, when the calling subscriber A dials the number of a specific called subscriber C, said calling subscriber is connected to the malicious call trunk 38 and the telephone number identifying information of the called subscriber C is transferred to the intraoffice register 46, and the operation is similar to that in which the call is made to the subscriber B. When the marker 2 is actuated by the intraoffice register 46 and receives the telephone number identifying information of the called subscriber C, the marker 2 again sends such information to the translator 11 and indicates that said translator has been actuated for the second time. The translator 11 determines from this that the telephone connection is to be established within its own office or telephone exchange 1 and so advises the marker 2. When the marker 2 is advised that the telephone connection is to be established within its own office or telephone exchange 1, it transfers the telephone number identifying information of the called subscriber to the number group 29. The number group 29 transfers back to the marker 2 information indicating the position at which the called subscriber C is housed in the link frame 4.

The marker 2 also receives from the number group 29 information that the telephone number identifying information of the called subscriber is the telephone number of the specific subscriber C. On the other hand, the marker 2 determines the position at which the malicious call trunk 38 is housed by known equipment in a known manner when said marker is actuated by the intraoffice register 46. The marker 2 then controls the connection of the malicious call trunk 38 to the intraoffice trunk 34 via a route 64 through the link frame 4 and the connection of said intraoffice trunk 34 to the subscriber C, in accordance with the information which indicates the position at which said malicious call trunk is housed in said link frame and the information which indicates the position at which said subscriber is housed in said link frame. After the call has been initiated by the calling subscriber A, the activity by the called subscriber C and the display by the malicious call trunk 38 are the same as those described in the relation to a call by said calling subscriber A to the called subscriber B.

Figure 2:
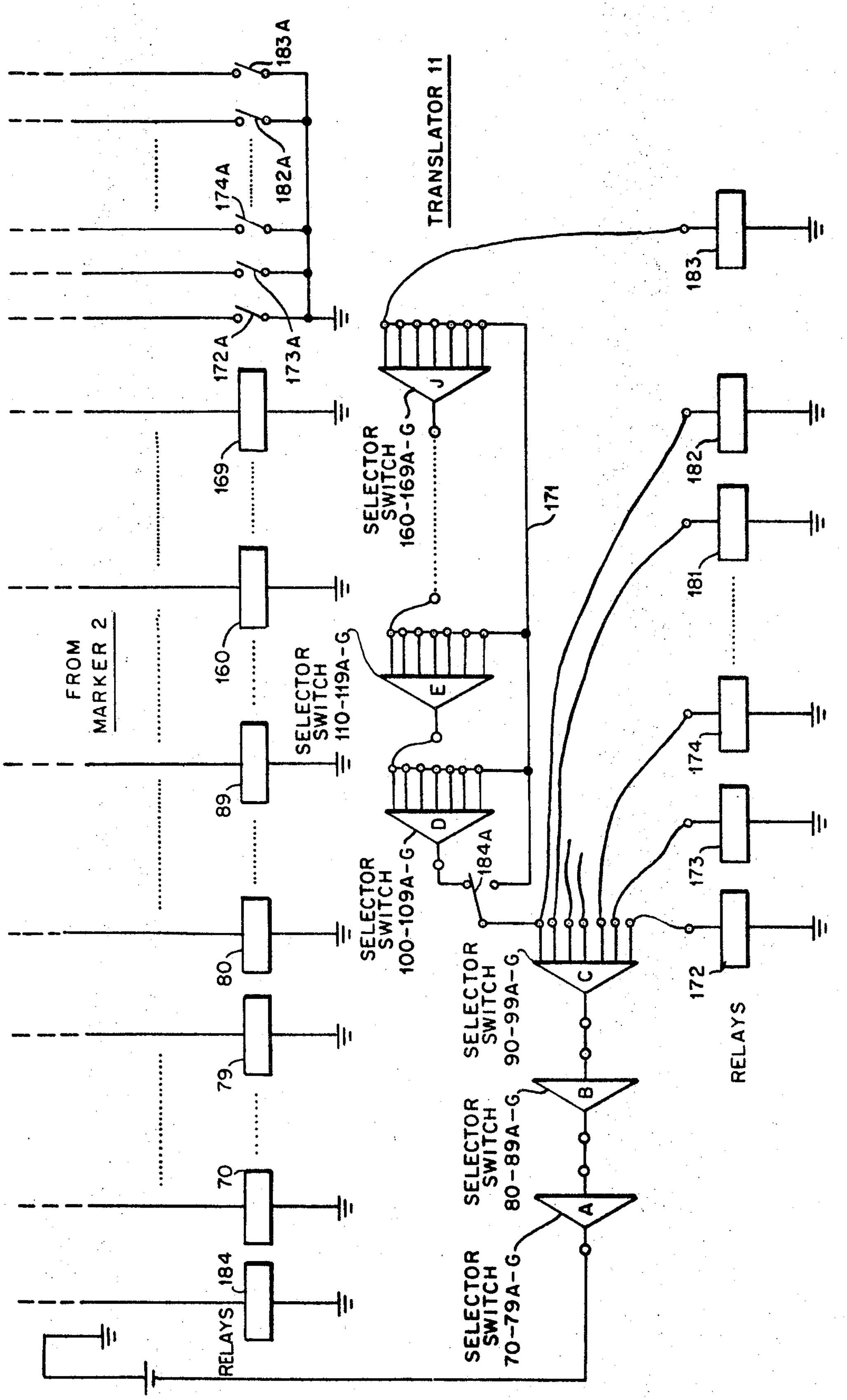
FIG. 2 is a schematic circuit diagram of the translator 11 of the embodiment of FIG. 1.

FIG. 2 is a circuit arrangement of part of the translator 11 of the telephone exchange 1 of FIG. 1. In FIG. 2, a plurality of information-receiving relays 70 to 79, 80 to 89, and so on, to 160 to 169, receive the identifying information of the number of the called subscriber from the marker 2. The relays 70 to 79 receive the A code of the information, the relays 80 to 89 receive the B code of the information, the relays 90 to 99 (not shown in the FIG.) receive the C code of the information, the relays 100 to 109 (not shown in the FIG.) receive the D code of the information, the relays 110 to 119 (not shown in the FIG.) receive the E code of the information, the relays 120 to 129 (not shown in the FIG.) receive the F code of the information, the relays 130 to 139 (not shown in the FIG.) receive the G code of the information, the relays 140 to 149 (not shown in the FIG.) receive the H code of the information, the relays 150 to 159 (not shown in the FIG.) receive the I code of the information, and the relays 160 to 169 receive the J code of the information.

A selector switch 70–79A–G is controlled by the relays 70 to 79, a selector switch 80–89A–G is controlled by the relays 80 to 89, a selector switch 90–99A–G is controlled by the relays 90 to 99 (not shown in the FIG.), a selector switch 100–109A–G is controlled by the relays 100 to 109 (not shown in the FIG.), a selector switch 110–119A–G is controlled by the relays 110 to 119 (not shown in the FIG.), and so on, and a selector switch 160–169A–G is controlled by the relays 160 to 169. The selector switches 70–79A–G, 80–89A– and 90–99A–G are connected in series, with a contact terminal of each connected to the input of the next-succeeding one of said selector switches. The selector switches 100–109A–G to 160–169A–G are connected with all of the contacts of each in common series connection connected to a common lead 171 and with a contact of each connected to the input of the next-succeeding one of said selector switches.

A plurality of route relays 172, 173, 174, 175 (not shown in the FIG.), 176 (not shown in the FIG.), 177 (not shown in the FIG.), 178 (not shown in the FIG.), 179 (not shown in the FIG.), 180 (not shown in the FIG.) and 181 are connected to the contacts of the selector switch 90–99A–G. A route relay 182 is connected to the common lead 171. The route relays 172 to 182 transfer route information to the marker 2 via their contacts 172A to 182A. A relay 183 is connected to the commonly connected contacts of the selector switch 160–169A–G and controls its contact 183A to identify a specific subscriber. A relay 184 is connected to the marker 2 and is energized when said marker actuates or energizes the translator 11 for the second time. The relay 184 has a contact 184A having one terminal connected to a contact of the selector switch 90–99A– and connectable to its other terminal between the input of the selector switch 100–109A–G and the common lead 171 of the selector switches 100–109A–G to 160–169A–G.

The selector switches 90–99A–G, 100–109A–G and 110–119A–G for the C, D and E codes of the telephone number of the specific subscriber are interconnected, so that they identify the calling subscriber. The selector switches 100–109A–G to 160–169A–G do not correspond to the telephone number of the specific subscriber and are connected in common to the route relay 182 via the common lead 171. When the calling subscriber is not identified, the route relay 182 is connected to a contact of the selector switch 90–99A–, as shown by broken lines.

If the marker 2 transfers to the translator 11 the telephone number identifying information of the called subscriber received from the originating register 5 (FIG. 1), said translator receives such information via the energization of the receiving relays 70 to 79, 80 to 89, 90 to 99, 100 to 109, 110 to 119, 120 to 129, 130 to 139, 140 to 149, 150 to 159 and 160 to 169. The translator 11 determines the type of connection and the form of signal in accordance with the received telephone number identifying information of the called subscriber by known apparatus in a known manner.

The route is determined by the selector switches. If the route is determined by the A, B and C codes of the received telephone number identifying information of the called subscriber, that is, the selector switches 70–79A–G, 80–89A–G and 90–99A–G, and said selector switches determine that the telephone number identifying information of the called subscriber is not the telephone number of the specific subscriber, one of the relays 172 to 182 is energized. However, when the telephone number of the specific subscriber cannot be determined by the A, B and C codes, the telephone number of the specific subscriber is determined by the selector switches 100–109A–G to 160–169A–G, and if it is determined that the telephone number identifying information of the called subscriber is not the telephone number of the specific subscriber, the route relay 182 is energized via the determined selector switch. If the telephone number identifying information of the called subscriber is the number of the specific subscriber, the relay 183 is energized and it determines the fact that the telephone number identifying information of the called subscriber is the telephone number of the specific subscriber.

If the telephone number identifying information of the called subscriber is the telephone number of a general subscriber, the translator 11 transmits the corresponding route information to the marker 2 via the contacts 172A to 182A. If the telephone number identifying information of the called subscriber is the telephone number of the specific subscriber, the marker 2 is so advised via the contact 183A. In this case, the marker 2, as hereinbefore described, connects the malicious call trunk 38 (FIG. 1), and transfers the telephone number identifying information of the called subscriber to the intraoffice register 46, and is released or deenergized. When the marker 2 is again energized or actuated by the intraoffice register 46, and receives the telephone number identifying information of the called subscriber, said marker actuates the translator 11 again and transfers the telephone number identifying information of the called subscriber and energizes the relay 184 of FIG. 2.

In translator 11, the energization of the relay 184 moves the contact 184A in clockwise direction, so that the connection between the selector switch 90–99A–G and the selector switch 100–109A–G is broken. Consequently, the telephone number of the specific subscriber is not determined by the received telephone number identifying information of the called subscriber and the route relays 172A to 182A, corresponding to the received information, are energized as in the case of general connection, and such information is transferred to the marker 2. The marker 2 connects the malicious call trunk 38 to the outgoing trunk 14 or the intraoffice trunk 34 (FIG. 1) in accordance with the route information.

FIG. 3 shows part of the malicious call trunk 38 of FIG. 1 in detail. In FIG. 3, an A position relay 191 controls its contacts 191A, 191B and 191C. A B position relay 192 controls its contacts 192A, 192B, 192C, 192D, 192E, 192F, 192G, 192H, 192I and 192J. A supervising relay 193 supervises the response of the called subscriber by controlling its contacts 193A, 193B, 193C, 193D, 193E and 193F. A timing relay 194 controls its contacts 194A, 194B, 194C and 194D. A calling subscriber determining and display relay 195 controls its contacts 195A, 195B, 195C, 195D, 195E and 195F.

An audible alarm 196 such as, for example, a bell or buzzer, or the like, is connected in series with a battery 197 and the contacts 194D and 195E. A display lamp 198 is connected in series with a battery 199 and the contact 195C. The malicious call trunk 38 of FIG. 3 is connected to the calling subscriber via output terminals 201, 202 and 203 of the link frame 4 (FIG. 1), and is connected to the outgoing trunk 14 or the intraoffice trunk 34 (FIG. 1) via output terminals 204, 205 and 206 of said link frame.

If the marker 2 is connected to the malicious call trunk 38, the B position relay 192 is energized. When the calling subscriber is then connected to the malicious call trunk 38, the A position relay 191 is energized via the telephone circuit or loop of said calling subscriber, and the B position relay 192 is maintained in its energized condition via its contact 192C and the contact 191A of the relay 191. The malicious call trunk 38 is also connected to the specific subscriber via the outgoing trunk 14 or the intraoffice trunk 34 (FIG. 1). If the specific subscriber responds, the supervising relay 193 is energized and causes the energization of the timing relay 194 via the contacts 193B, 192E and 191B, and is maintained in energized condition via its contact 194A and the contact 191C.

If the calling subscriber initiates a call to the specific subscriber under these conditions, and the call is an ordinary one, and both said calling subscriber and the called subscriber replace the receivers of their handsets upon the completion of the call, the relays 191, 192, 193 and 194 are all deenergized or released and the malicious call trunk 38 is deenergized or released without identifying the calling subscriber. When it is necessary to identify the calling subscriber, the channel is disconnected for an instant by the instantaneous depression of the cradle switch of his handset by the called subscriber, so that the supervising relay 193 is instantaneously deenergized. The instantaneous deenergization of the supervising relay 193 causes the energization of the calling subscriber determining and display relay 195 via the then normally positioned contact 193B, the switched contact 192G, the switched contact 194B and the normally positioned contact 195F. If the supervising relay 193 is energized, the calling subscriber determining and display relay 195 is maintained in energized condition via its contact 195F and a key-operated contact 207.

When the relay 195 is energized, the lamp 198 is energized via the switched contact 195C, and the audible alarm 196 is energized via the switched contact 195E, thereby indicating to the maintenance personnel or maintainer that a malicious call has been made. If the telephone exchange system is such that even if the specific subscriber instantaneously depresses the cradle switch of his handset, the information is not transferred to the malicious call trunk 38, or if the specific subscriber forgets to instantaneously depress his cradle switch during the call, if the calling subscriber terminates the call and the specific subscriber retains his receiver off the cradle switch of his handset for a specific period of time after the completion of the call by the calling subscriber, the relays 191, 192 and 194 are deenergized or released. The relay 193, however, is not deenergized, since the circuit or loop is maintained closed by the contact 193F thereof, although the contact 192J is then opened. When the B position relay 192 is deenergized, a special sound source 208 is connected to the third winding of the supervising relay 193 via the switched contact 193A and the contact 192D in its normal closed position. The special sound from the sound source 208 is thus induced in the primary and secondary windings of the supervising relay 193 and is transmitted to the specific subscriber to remind him not to replace his receiver for the period during which he can hear such special sound.

If 10-second pulses are provided at a terminal 209 of the malicious call trunk 38, due to the energization of the supervising relay 193 and the deenergization of the B position relay 192, the timing relay 194 is energized via the normally positioned contact 192F and the switched contact 193C. If 10-second pulses are provided at a terminal 211, after the relay 194 has been energized, the calling subscriber determining and display relay 195 is energized via the normally positioned closed contact 192G, the switched contact 194B and the normally positioned contact 195F. When the relay 195 is energized, it energizes the display lamp 198 via its contact 195C and energizes the audible alarm 196 via its contact 195E. The energization of the relay 195 terminates the transmission of special sound from the special sound source 208 by opening the contact 195B of said relay, and the channel of the specific subscriber is released or opened.

As hereinbefore described, in the malicious call trunk 38 of FIG. 3, the release of the calling subscriber, or the termination of the call by said calling subscriber, releases or deenergizes the relays 191 and 192, so that the terminal 203 which holds the channel between the calling subscriber and said malicious call trunk is cut off or opened via the contact 192A between said terminal and ground. The calling subscriber is therefore disconnected from the malicious call trunk 38, and the channel of said calling subscriber is no longer held. The calling subscriber may, or course, arbitrarily dial after he has terminated the call, but there is no possibility that said calling subscriber may be apprised of the fact that his identity is being investigated and determined.

FIG. 4 discloses parts of the marker 2 and the recorder 44 of FIG. 1 In FIG. 4, the recorder 44 comprises a plurality of relays 221, 222, 223 (not shown in the FIG.), 224 (not shown in the FIG.), 225 (not shown in the FIG.), 226 (not shown in the FIG.), 227 (not shown in the FIG.), 228 (not shown in the FIG.), 229 (not shown in the FIG.) and 231 for receiving the telephone number identifying information of the calling subscriber. A starting relay 232 and a relay 233 for receiving a time pulse from a timer 234 are included in the recorder 44.

A relay 235 (not shown in the FIGS.) is energized when the marker 2 starts the operation of the recorder 44 and there is a fault. When the relay 235 (not shown in the FIGS.) is energized, it closes its contact 235A in the marker 2. If the recorder 44 is a known fault recorder, the contact 235A is a known fault recorder starting contact. A relay 236 (not shown in the FIGS.) is energized when the marker 2 is advised by the translator 11 (FIG. 1) that the telephone number identifying information of the called subscriber is the telephone number of the specific subscriber. When the relay 236 (not shown in the FIGS.) is energized, it closes the contact 236A of the marker 2.

Thus, when the marker 2 is advised by the translator 11 that the telephone number identifying information of the called subscriber is the telephone number of the specific subscriber, the relay 236 (not shown in the FIGS.) is energized and causes energization of the relay 232 of the recorder 44 via the contact 236A of the relay 236. Energization of the relay 232 actuates or energizes the recorder 44. The recorder 44 receives the telephone number identifying information of the calling subscriber from the marker 2 via its receiving relays 221 to 231 and records such information in any suitable manner such as, for example, by printing or punching. The recorder 44 receives a time pulse from the timer 234 due to the closing of the contact 232A of the relay 232 when said relay is energized, and thereby records the time in a known manner.

While the invention has been described by means of a specific example and in a specific embodiment, we do not wish to be limited thereto, for obvious modifications will occur to those skilled in the art without departing from the spirit and scope of the invention.

We claim:

1. A calling subscriber identification system in an automatic telephone exchange system, said calling subscriber identification system comprising:

calling number determining means for determining the telephone number of a calling subscriber upon said calling subscriber making a telephone call to a called subscriber;

called number determining means for determining the telephone number of the called subscriber;

subscriber-determining means for determining if the called subscriber is a specific subscriber in accordance with the telephone number of said called number determining means;

recording means for recording the telephone number of said calling subscriber when said subscriber-determining means determines that a telephone connection is made between said calling subscriber and said specific subscriber as the called subscriber;

calling subscriber identifying means for determining and indicating that the telephone number of the calling subscriber should be determined when the connection between the calling subscriber identifying means and the called subscriber is momentarily interrupted by the called subscriber or when the connection between the calling subscriber identifying means and the called subscriber is held by the called subscriber for a constant period of time when the connecting means between the calling subscriber identifying means and the calling subscriber is cut off;

outgoing trunks and intraoffice trunks;

link frame means having input means and output means, the calling subscriber identifying means being connected to the input means and the output means of the link frame means and the calling subscriber being connected to the input means of the link frame means;

connecting means for connecting the calling subscriber with the calling subscriber identifying means via the output means of the link frame means; and connecting means for connecting one of the outgoing trunks and the intraoffice trunks with the calling subscriber identifying means via the input means of the link frame means.

2. A method of calling subscriber identification in an automatic telephone exchange system including calling subscriber identifying means, outgoing trunks, intraoffice trunks and link frame means having input means and output means, said calling subscriber identification method comprising the steps of:

determining the telephone number of a calling subscriber upon the calling subscriber making a telephone call to a called subscriber;

determining the telephone number of the called subscriber;

determining if the called subscriber is a specific subscriber in accordance with the telephone number of the called subscriber;

recording the telephone number of the calling subscriber when a telephone connection is made between the calling subscriber and the specific subscriber as the called subscriber;

determining and indicating the telephone number of the calling subscriber when the connection between the calling subscriber identifying means and the called subscriber is momentarily interrupted by the called subscriber or when the connection between the calling subscriber identifying means and the called subscriber is held by the called subscriber for a constant period of time when the connecting means between the calling subscriber identifying means and the calling subscriber is cut off;

connecting the calling subscriber identifying means to the input means and the output means of the link frame means and connecting the calling subscriber to the input means of the link frame means;

connecting the calling subscriber with the calling subscriber identifying means via the output means of the link frame means; and connecting an outgoing trunk and the intraoffice trunks with the calling subscriber identifying means via the input means of the link frame means.

PO-1050
(5/69)

UNITED STATES PATENT OFFICE
CERTIFICATE OF CORRECTION

Patent No. 3,576,951 Dated May 4, 1971

Inventor(s) TOMOMI UCHIDA ET AL

It is certified that error appears in the above-identified patent and that said Letters Patent are hereby corrected as shown below:

The priority date should read --December 5, 1967--

Signed and sealed this 31st day of August 1971.

(SEAL)
Attest:

EDWARD M.FLETCHER,JR.
Attesting Officer

WILLIAM E. SCHUYLER, JR.
Commissioner of Patents